United States Patent [19]
Del Rosso

[11] 3,955,637
[45] May 11, 1976

[54] WEIGHING APPARATUS
[75] Inventor: Victor Del Rosso, Ithaca, N.Y.
[73] Assignee: Hi-Speed Checkweigher Co., Inc., Ithaca, N.Y.
[22] Filed: June 10, 1975
[21] Appl. No.: 585,476

[52] U.S. Cl. .............................. 177/145; 177/52; 214/2; 209/121
[51] Int. Cl.² ...................................... G01G 19/14
[58] Field of Search ................ 177/145, 52, 53, 50, 177/116; 209/121; 214/2, 89; 68/189

[56] References Cited
UNITED STATES PATENTS
2,606,658  8/1952  Powell .......................... 209/121 X
3,390,732  7/1968  McMackin ........................... 177/53

*Primary Examiner*—Joseph W. Hartary
*Attorney, Agent, or Firm*—Bean & Bean

[57] ABSTRACT

An apparatus particularly adapted for weighing spools of yarn without subjecting the yarn to physical contact, which features an expansible mandrel depending from a weigher and having a lower end adapted to be releasably locked within the core tube of the spool. The mandrel is capable of undergoing movement independently of the weigher to accommodate for axial misalignments of the core tube when presented to the mandrel and to isolate the weigher relative to shocks produced as an incident to alignment and/or pickup of the spool by the mandrel.

15 Claims, 12 Drawing Figures

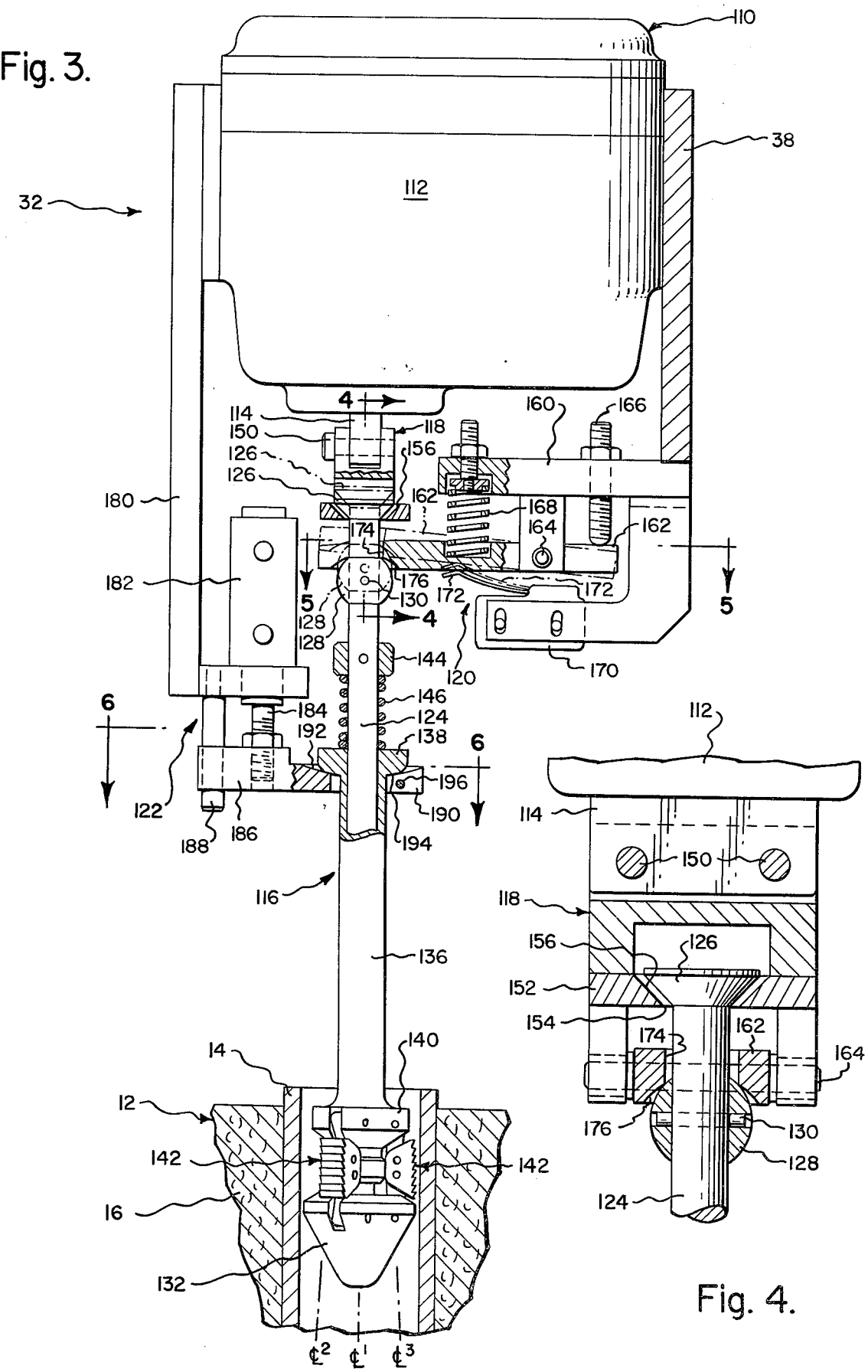

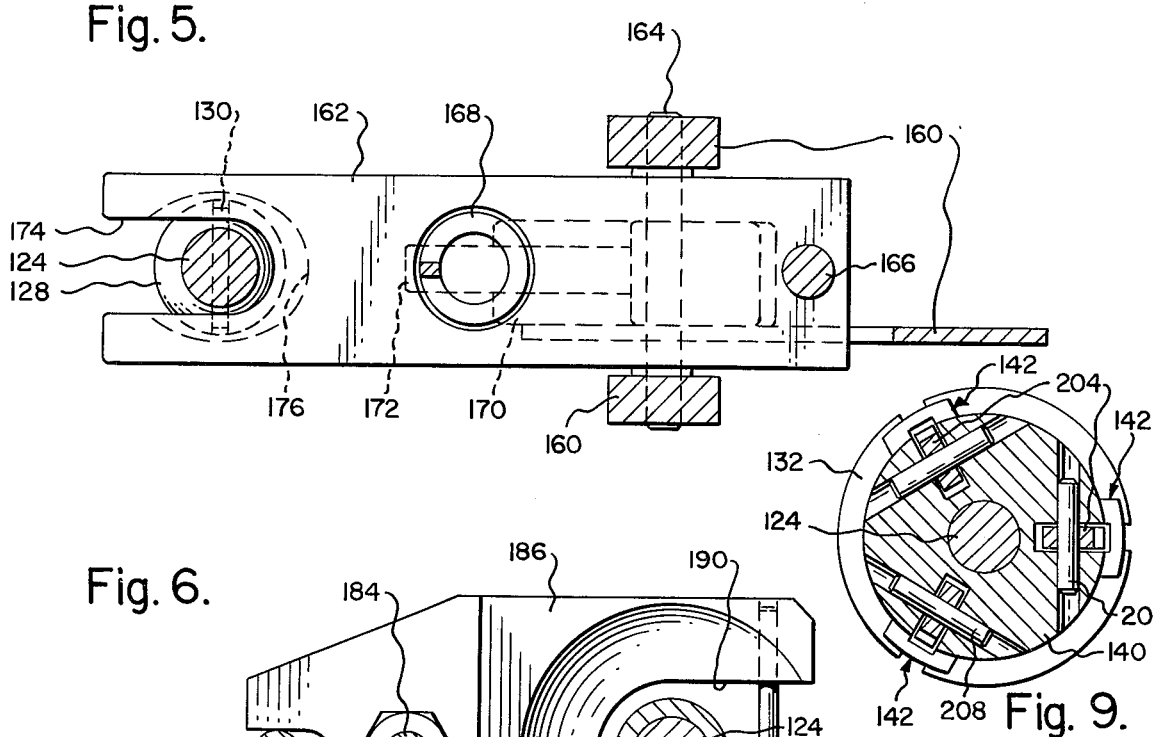
Fig. 5.
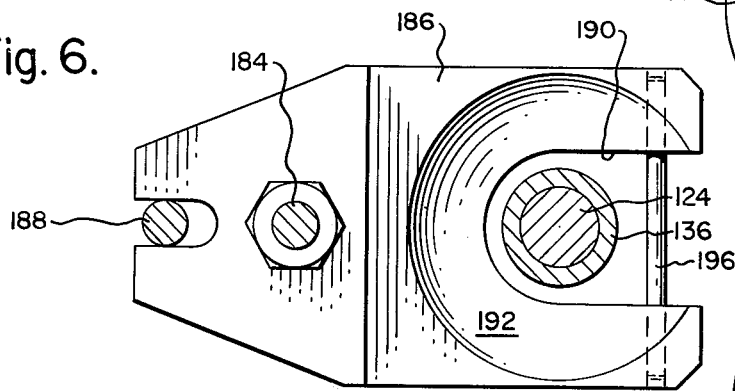
Fig. 6.
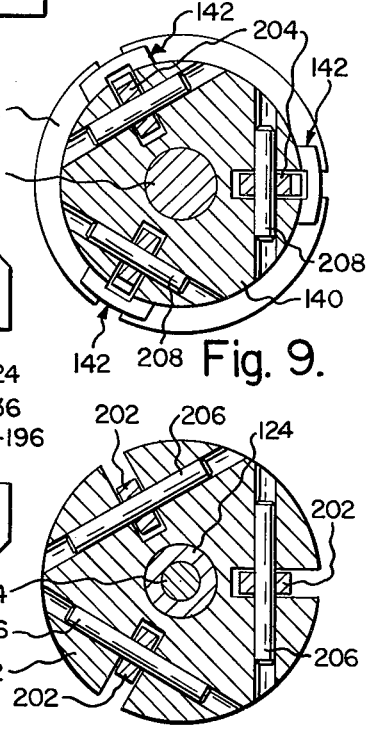
Fig. 9.
Fig. 10.
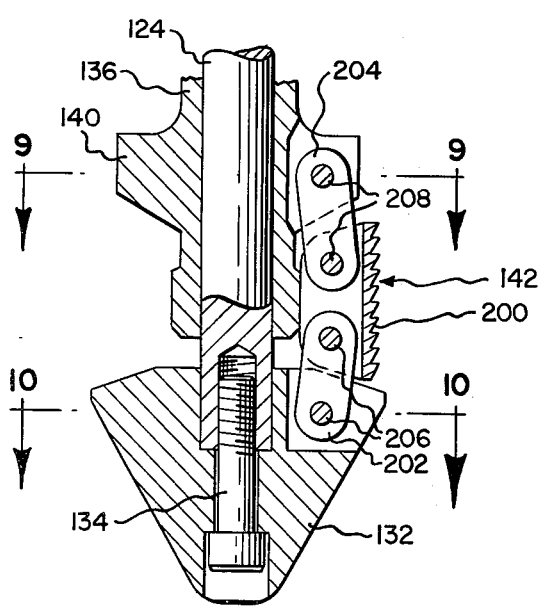
Fig. 7.
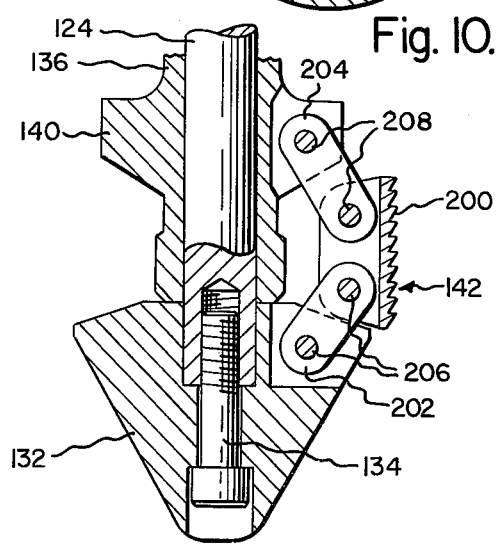
Fig. 8.

WEIGHING APPARATUS

BACKGROUND OF THE INVENTION

A dying operation is now performed on certain synthetic knit yarns while the yarn is wound about a core tube to form a spool of yarn; the core tube being employed to afford means for handling, manipulating or storing the yarn without physical contact therewith. Physical or machine contact with this type of yarn is intentionally avoided in order to prevent it from being "snagged" or "smeared" with dirt or other foreign matter, which might interfere with proper dying thereof.

In that the density/weight of yarn tends to vary from spool to spool and in that the dying time required to achieve any given yarn coloration varies with the density/weight of yarn on each spool, it is necessary to predetermine the precise weight of each spool, if the yarn on all spools being treated is to acquire the same color. Heretofore, it has been the practice to weigh spools one at a time and by hand, due to the difficulty presented by the requirement that machine contact with the yarn be avoided.

SUMMARY OF THE INVENTION

The present invention is particularly directed towards the provision of apparatus capable of automatically weighing groups of spools of yarn successively presented thereto at a relatively high rate of speed without exposing the yarn to any physical contact.

A preferred form of the present apparatus includes a weighing station including a plurality of stationary weighers from which depend mandrels having expansible lower or gripping ends sized to be removably locked one within the core tube of each spool presented for weighing; a conveyor adapted to transport spools in a stepwise manner through the weighing station wherein their core tubes are arranged in essential alignment with the mandrels; and an elevating apparatus for removably slide fitting the core tubes of the spools over the lower gripping ends of the mandrels.

The mandrels are characterized as being capable of undergoing movement independently of their associated weighers in order to accommodate the mandrels for minor axial misalignments of the core tubes of the spools when presented thereto and to effectively isolate the weigher relative to shocks and forces produced as an incident to alignment and pickup of the spools by the mandrels.

While the present invention will be specifically disclosed for use in weighing spools of yarn, it will be appreciated that it may be employed for weighing dissimilar articles having openings permitting such articles to be removably slide fitted onto the lower or gripping ends of the mandrels. Moreover, the present apparatus may be afforded even greater utility by simple modification of the lower or gripping ends of the mandrels to permit external gripping or clamping of articles to be weighed.

DRAWINGS

The nature and mode of operation of the present invention will now be more fully described in the following detailed description taken with the accompanying drawings wherein:

FIG. 3 is an enlarged, partially sectionalized view showing a weighing unit in rest-non-weighing condition;

FIG. 4 is a sectional view taken generally along the line 4—4 in FIG. 3;

FIG. 5 is a sectional view taken generally along the line 5—5 in FIG. 3;

FIG. 6 is a sectional view taken generally along the line 6—6 in FIG. 3;

FIG. 7 is an enlarged sectional view taken vertically through the lower or gripping end of a mandrel, showing parts thereof in an inoperative position;

FIG. 8 is a view similar to FIG. 7, but showing parts of the mandrel in an operative position;

Figure 11:
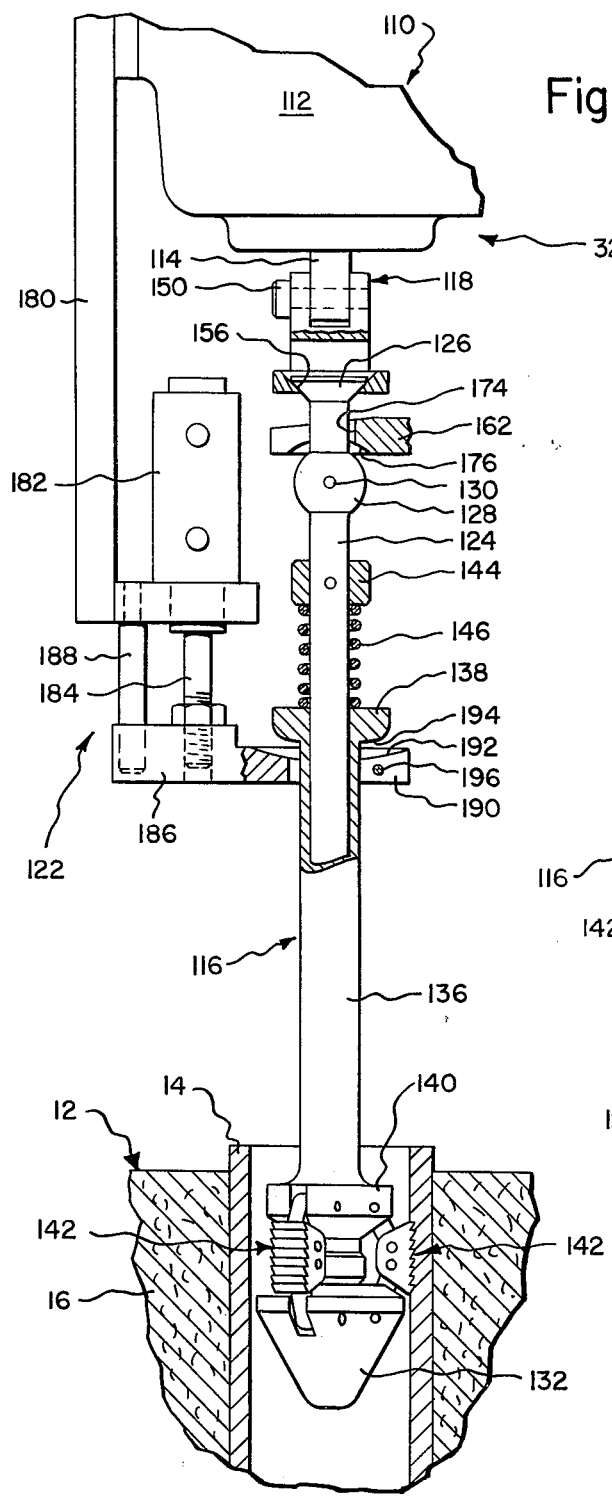
Figure 12:
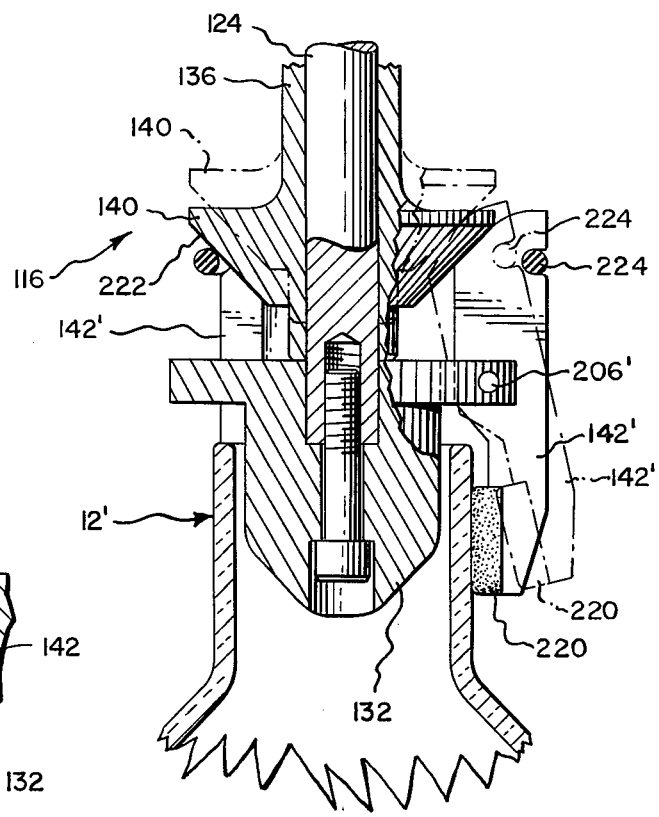

FIGS. 9 and 10 are sectional views taken generally along lines 9—9 and 10—10, respectively in FIG. 7;

FIG. 11 is an enlarged fragmentary view similar to FIG. 3, but showing the weighing unit in weighing condition; and FIG. 12 is a view similar to FIG. 7, but showing an alternative form of the present invention.

DETAILED DESCRIPTION

Figure 1:
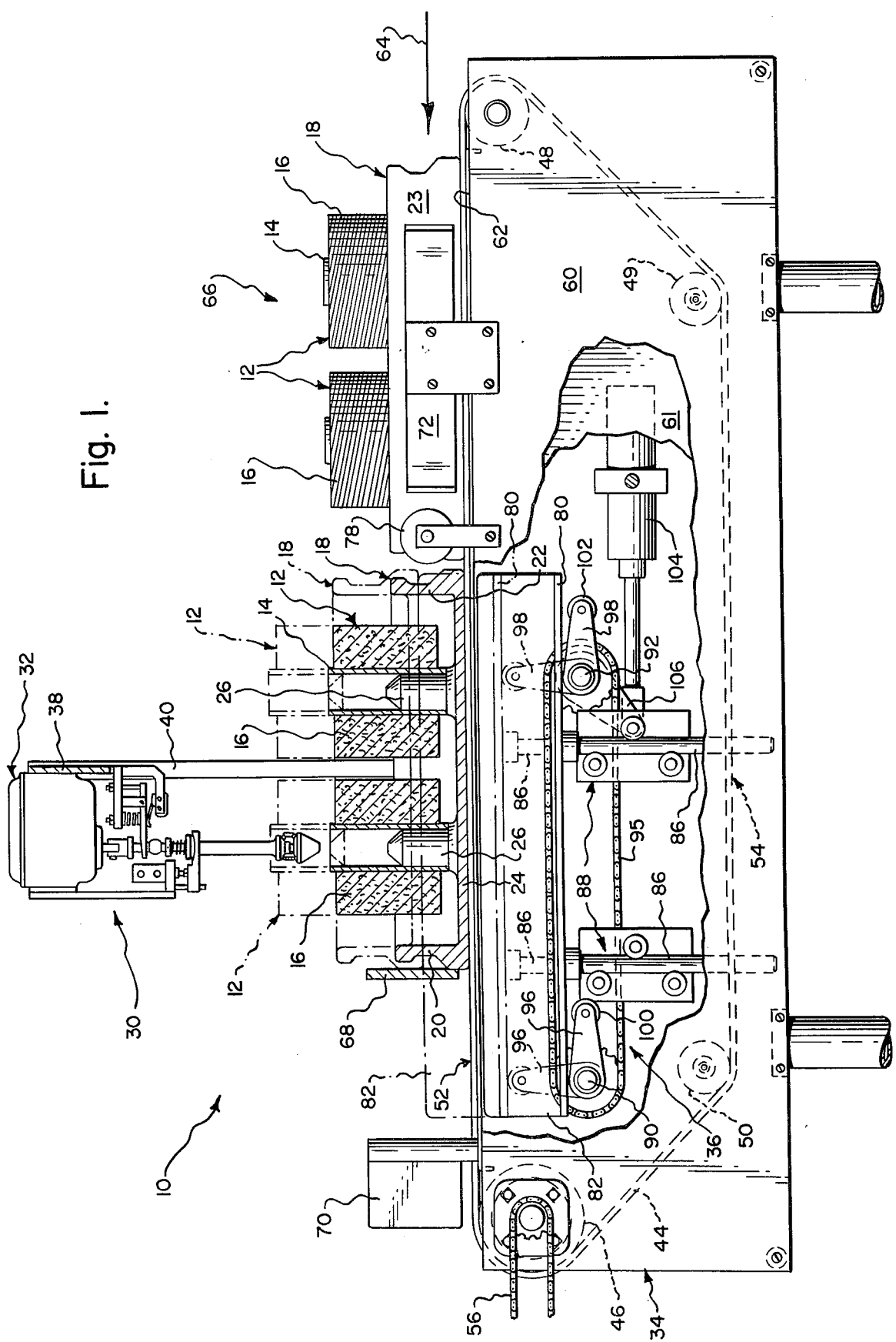
FIG. 1 is a side elevational view of a machine formed in accordance with the present invention.
Figure 2:
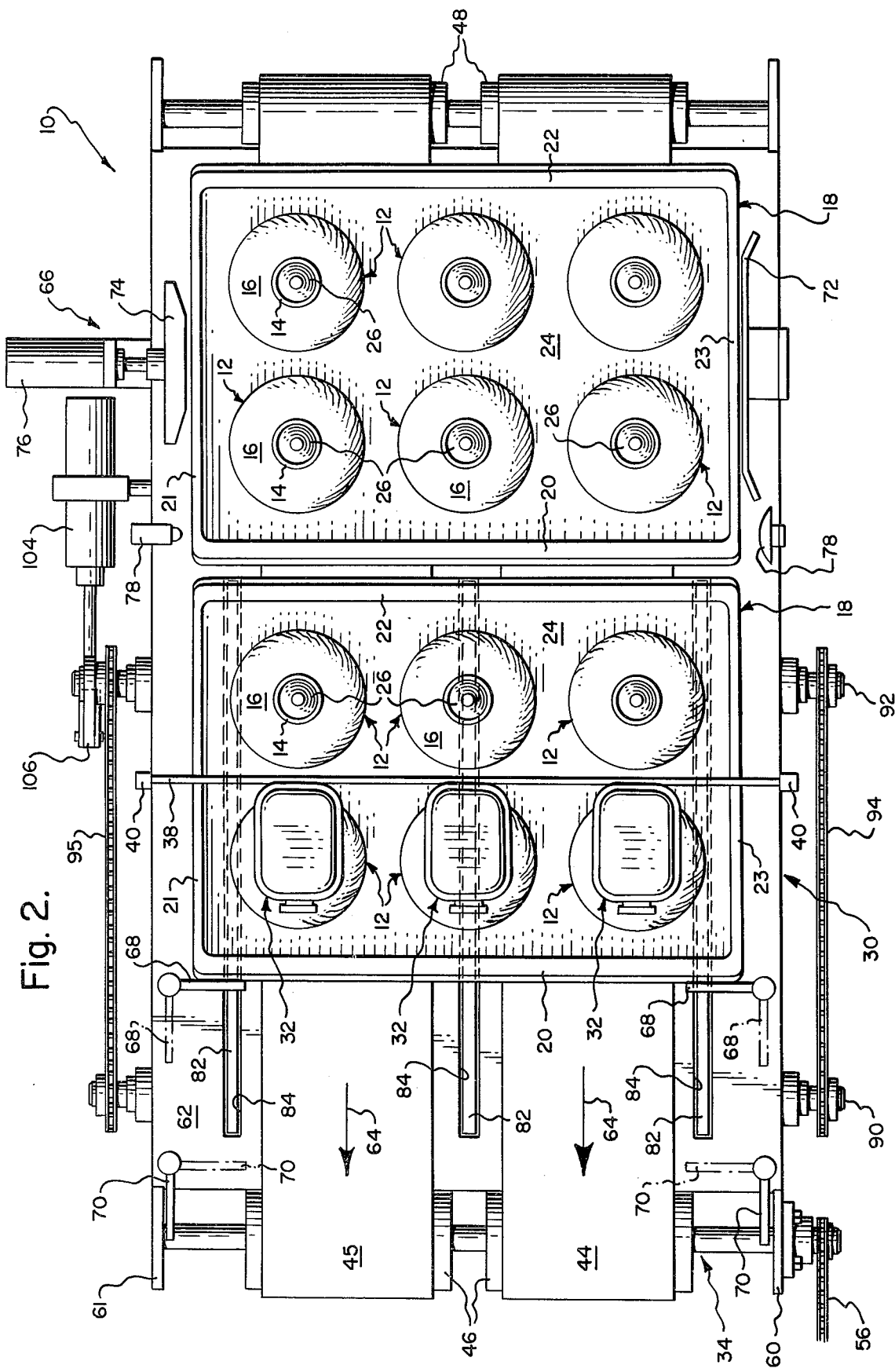
FIG. 2 is a top plan view thereof.

By making reference to FIGS. 1 and 2, it will be understood that a machine formed in accordance with the present invention is generally designated as 10 and particularly adapted for use in weighing spools of yarn 12 characterized as comprising an open ended core or support tube 14 about which yarn 16 is wound. Spools 12 may be presented to machine 10 in any suitable manner, but for purposes of illustration are shown as being supported within spool handling or storage carriers 18, which are essentially in the form of open top, generally rectangular boxes having side walls 20–23 and a bottom wall 24. A plurality of stepped diameter, spool support pins 26 are fixed to upstand from bottom wall 24 and dimensioned to be loosely slide fit received within the lower ends of core tubes 14. When spools 12 are supported on pins 26 the yarn 16 carried by each spool is free from contact with carrier walls 20–24, as well as the yarn carried on an adjacently disposed spool. In the conveyor transport position or orientation of carriers 18 shown in the drawings, side walls 20 and 22 may be considered as leading and trailing walls, respectively, and pins 26 of each carrier 18 may be considered as being arranged in two transversely extending rows of pins, wherein three pins are arranged in each row.

Again referring to FIGS. 1 and 2, it will be understood that machine 10 generally comprises a weighing station 30 having a plurality of weighing units 32; a conveyor 34 for transporting carriers 18 in order to successively position individual rows of spools 12 in operative alignment with weighing units 32; and an elevating mechanism 36 for lifting carriers 18 from supporting engagement with conveyor 34 in order to removably position the operatively aligned spools in operative or weighing association with weighing units 32.

The number and arrangement of weighing units 32 employed in machine 10, as well as the controls to be hereinafter described in connection with conveyor 34, will depend upon the number and arrangement of support pins 26 within carriers 18, as well as the overall shape and size of such carriers. Thus, in the illustrated construction wherein carriers 18 are constructed and arranged to present to the weighing station 30 successive rows of spools wherein each row includes three spools, three weighing units 32 would be arranged in a single row extending transversely of the direction of conveyor travel. Units 32 may be conviently supported as by a common bracket 38 having its opposite ends fixed to a pair of posts or standards 40 which upstand from adjacent opposite sides of conveyor 34. As will be apparent, weighing units 32 could alternately be arranged in two transversely extending rows, if it were desired to simultaneously weigh all spools in each carrier 18, or in two rows extending in the direction of conveyor travel, if carriers 18 when fed to the weighing station, would be rotated through 90° from their conveyor transport position shown in the drawings.

To facilitate description of the present invention, conveyor 34 will first be described as generally including endless conveyor elements, such as may be defined by transversely spaced endless belt elements 44 and 45. Belt elements 44 and 45 may be simultaneously and continuously driven by any suitable means, such as a drive roller 46, and passed over idler rollers 48–50 to define a generally horizontally extending, carrier transport flight 52 and a return flight 54. Drive roller 46 may be driven by any suitable means, such as an electric motor, not shown, via a drive chain 56. Rollers 46 and 48–50 may be suitably supported, as by being end journaled on conveyor side mounting plates 60 and 61, which are in turn suitably spaced and interconnected by means including a top plate 62. Top plate 62 may additionally afford support for belt elements 44 and 45 during travel thereof along transport flight 52 intermediate rollers 48 and 46 in the direction indicated by arrows 64 in FIGS. 1 and 2.

Travel of carriers 18 in the direction of conveyor belt movement is sequentially interrupted by operation of an escapement device 66, which is disposed adjacent the inlet end of conveyor transport flight 52 and first and second pairs of gate devices 68 and 70, respectively. While escapement device 66 may be of any suitable construction, it is shown by way of example as including a stationary guide-stop plate 72 arranged to extend along one side of the conveyor and mounted for instance on side plate 60, and a movably supported clamping plate 74, which is disposed in transverse alignment with guide-stop plate 72. Any suitable means, such as a pneumatic cylinder 76 may be employed to effect transversely directed reciprocating movements of clamping plate 74 relative to guide-stop plate 72 in order to releasably clamp successively presented carriers 18 therebetween. Operation of pneumatic cylinder 76 may be controlled in part by an electric eye device 78, which is arranged to sense the presence of carriers 18.

As will be apparent from viewing FIGS. 1 and 2, escapement device 66 serves to temporarily arrest transport movements of carriers 18 at a point upstream of weighing station 30 whenever the weighing station is occupied by another carrier. When a carrier is released by the escapement device, the released carrier is transported by belts 44 and 45 into the weighing station whereupon its forward movement is again arrested by the first pair of gate devices 68, which are positioned such that spools 12 of the first row of spools supported by such carrier are arranged below and in operative vertical alignment one with each of weighing units 32. After a weighing operation has been performed on the first row of spools 12 in the manner to be described, the first pair of gate devices 68 open into their phantom line positions shown in FIG. 2, whereby to release the carrier for movement with the conveyor belts until its movement is once again arrested by engagement thereof with the second pair of gate devices 70, when the latter are disposed in their phantom line positions also shown in FIG. 2. The arrangement is such that when the carrier engages the second pair of gate devices, spools 12 of the second row of spools are placed in operative vertical alignment one with each of weighing units 32. After a weighing operation has been performed on this second row of spools, the second pair of gate devices are returned to their full line or released positions shown in FIG. 2 thereby to permit the "weighed spool" carrier to be discharged from the machine; the first pair of gate devices 68 being thereafter returned to their full line positions shown in FIGS. 1 and 2 for the purpose of positionally engaging the next carrier presented to the weighing station. While this mode of conveyor operation is preferred, it would of course be possible to employ a conveyor driven in a stepwise manner or to manually feed carriers to the weighing station.

Elevating mechanism 36 generally includes an essentially horizontally disposed platform 80 having a plurality of upstanding lifter plates 82, which are disposed in vertical alignment with and dimensioned to pass upwardly through slot openings 84 defined by top plate 62, and a plurality of guide pins or rods 86, which depend from platform 80 and cooperate with suitable roller type guide devices 88 to constrain platform 80 for vertical reciprocating movements between its lower or rest position and its upper or operative position shown in full and phantom line in FIG. 1, respectively. As will be apparent from viewing FIG. 2, slot openings 84 are elongated in the direction of conveyor movement and transversely staggered relative to belt elements 44 and 45. It will be understood that when platform 80 is in its rest position, the upper edges of lifter plates 82 are disposed below the upper surfaces of belts 44 and 45 and thereby free of engagement with bottom wall 24 of a carrier present in weighing station 30. Movement of platform 80 into its operative position causes lifter plates to underengage carrier bottom wall 24 and thereby lift the carrier into its phantom line position shown in FIG. 1, wherein spools 12 are arranged in operative or weighing association with weighing units 32.

Elevating mechanism 36 may include any suitable means for effecting vertical reciprocating movements of platform 80 in the manner described, but a particularly suitable arrangement is shown in FIGS. 1 and 2 as including a pair of drive shafts 90 and 92, which are end supported by side mounting plates 60 and 61 and drivingly interconnected by a pair of chain drives 94 and 95. Drive shafts 90 and 92 carry intermediate their ends lift arms 96 and 98 having roller devices 100 and 102 arranged to engage with the lower surface of platform 80. Alternating rotary movements of shafts 90 and 92 for the purpose of driving lift arms 96 and 98 between their lower or inoperative and upper or operative positions shown in full and phantom line in FIG. 1, respectively, may be effected by operation of pneumatic cylinder device 104, which is interconnected with shaft 92 by a crank arm 106.

By now referring to FIG. 3, it will be understood that weighing units 32 are of identical construction, wherein each includes a scale device 110 having a stationary casing 112 and a vertically downwardly projecting relatively movable scale operating member 114; a mandrel 116, which is removably connected to and suspended from operating member 114 by a hanger device 118; a bearing-overload device 120; and a support-bearing or weighing initiation device 122. Mandrel 116 includes an elongated, preferably cylindrically shaped rod 124 having a frusto-conical shaped upper head portion 126; a generally spherically shaped bearing 128, which is non-movably fixed as by a pin 130 to rod 124 in a spaced relationship vertically below head end portion 126; an article contour follower member in the form of a generally convex nose 132, which is suitably affixed as by a threaded bolt 134 to the lower end of rod 124 and sized to be freely received within core tube 14; a mandrel operating sleeve 136, which is formed with upper bearing and lower operating end portions 138 and 140, respectively, and disposed concentrically of and slideably supported on rod 124; a spool gripping or clamping assembly including a plurality of jaw devices 142, which are mounted on sleeve operating end portion 140 and nose 132; a ring 144, which is preferably fixed to rod 124 for adjustments lengthwise thereof; and an operating spring device, such as a coil spring 146 arranged concentrically of rod 124 and in end bearing engagement with nut 144 and sleeve bearing portion 138.

Hanger device 118 is shown in FIGS. 3 and 4 as being rigidly fixed to operating member 114, as by bolts 150, and as including a supporting plate 152 having a vertically extending through opening 154 sized to loosely receive rod 124 and a concentrically disposed conically shaped seat or supporting surface 156 adapted to supportingly engage with the conically shaped surface of rod head end portion 126.

Device 120 is shown in FIGS. 3-5 as including a mounting bracket 160; a bearing plate 162, which is supported on bracket 160 by a pivot pin 164 for vertical pivotal movements about an essentially horizontally disposed pivot axis; an adjustable stop 166, which is threadably fixed to bracket 160 in order to limit counter-clockwise pivotal movements of bearing plate 162 beyond its "rest" position shown in full line in FIG. 3; an overload spring device 168, which is adjustably mounted on bracket 160 for resiliently opposing clockwise directed pivotal movements of bearing plate 162 between its "rest" and "overload" positions shown in full and phantom line in FIG. 3; and an overload sensing device, such as micro switch 170, which is fixed to bracket 160 and includes a switch operator 172 disposed in engagement with bearing plate 162. Bearing plate 162 is formed with an end opening slot 174, which is dimensioned to loosely receive rod 124, and a downwardly facing, generally spherically shaped concave bearing surface 176, which is disposed concentrically relative to the rounded inner end of slot 174 and adapted to engage with rod mounted bearing 128, as best shown in FIG. 4. It will be understood that rod bearing 128 and bearing surface 176 cooperate, when in engagement, to define a center about which universal tilting movements of mandrel 116 may occur.

Device 122 is best shown in FIGS. 3 and 6 as including a mounting bracket 180, which is suspended from casing 112; an operator 182, such as may be defined by a pneumatic cylinder or solenoid having an operator rod 184 mounted for vertically directed reciprocating movements between the retracted or rest and extended or weighing positions thereof shown in FIGS. 3 and 11, respectively; and a support-bearing plate 186, which is fixedly carried by the lower end of operator rod 184 and constrained from rotation about the axis thereof by a bracket mounted guide pin 188. Support-bearing plate 186 is formed with an end opening slot 190, which is dimensioned to loosely receive sleeve 136, and an upwardly facing, generally spherically shaped concave bearing surface 192 sized and adapted to engagingly support downwardly facing generally spherically shaped convex bearing surface 194 of sleeve bearing portion 138. Suitable means such as a retainer pin 196 may be employed to retain sleeve 136 located within support-bearing plate slot 190. It will be understood that the center about which bearing surface 192 and preferably surface 194 is generated will be coincident with the center about which universal tilting movements of the mandrel may occur, when the parts of unit 32 assume their rest positions shown in full line in FIG. 3.

Jaw devices 142 are of identical construction and best shown in FIGS. 7-10 as each including a toothed, jaw bar or foot 200 and a pair of pivot links 202 and 204, which are connected by pivot pins 206 and 208 to the opposite ends of jaw bar 200 and to nose 132 and sleeve operating end portion 140, respectively. It will be understood that when unit 32 is in its rest condition shown in FIG. 3, sleeve operating end portion 140 is spaced vertically from nose 132 with the result that jaw bars 200 are retained in their rest or retracted positions, as best shown in FIG. 7. On the other hand, when unit 32 is in its weighing condition shown in FIG. 11, sleeve operating end portion 140 is disposed in abutting engagement with nose 132 with the result that jaw bars 200 are forced to assume their operative or extended positions, as best shown in FIG. 8.

More specifically, when a weighing unit is in its rest condition, operator rod 184 is in its fully retracted condition with the result that coil spring 146 is maintained in its fully compressed state, due to engagement or rod bearing 128 with bearing plate surface 176 and engagement of upper bearing surface 194 with support-bearing plate surface 192. In this connection, it will be understood that in the illustrated construction, spring device 168 necessarily exerts a greater spring force on bearing plate 162 than that exerted by coil spring 146, such that the former is normally effective in maintaining the bearing plate in its rest position shown in full line in FIG. 3 against the bias of spring 146. As previously indicated, stop 166 is operable to prevent counter-clockwise pivotal movements of bearing plate 162 beyond its rest position under the bias of spring device 168.

By viewing FIGS. 3 and 4, it will also be understood that when a weighing unit is in its rest condition, head end portion 126 is vertically displaced from seating engagement with surface 156 of hanger device supporting plate 152 and rod 124 is normally loosely centered within supporting plate opening 154, such that mandrel 116 is physically isolated from and freely movable relative to scale operating member 114. This spacing of the mandrel relative to hanger device 118 permits mandrel 116 to normally occupy a vertically disposed position indicated by the center line designation CL 1, while permitting universal tilting movements thereof about the center of tilting movements defined by rod bearing 128 and bearing plate surface 176, between the extreme positions designated as CL 2 and CL 3 without engagement of the mandrel with the hanger device 118. The extent of tilting movements of mandrel 116 may be conveniently limited, as for instance by engagement of sleeve 136 with the walls of support-bearing plate slot 190 and pin 196. As indicated above, the radius of curvature of surfaces 192 and 194 permits sliding movements therebetween incident to tilting movements of mandrel 116 without effecting relative displacements of rod 124 and sleeve 136 or changes in compression of spring 146.

Under normal operating conditions, carriers 18 serve to position spools 12 in operative alignment with weighing units 32, such that their core tubes 14 are arranged in essential co-axial alignment one with each of mandrels 116. Thus, when carriers 18 are lifted from belt elements 44 and 45 by operation of platform 80, the upper ends of the core tubes of the operatively aligned spools are merely fitted or freely slipped over mandrel nose portions 132, as indicated in FIG. 3, without effecting tilting movements or axial displacements of the mandrels. Any slight misalignment of a core tube with respect to its associated mandrel, which may result for instance from the core tube being slightly tilted relative to its support pin 26 or such support pin being arranged slightly off-center relative to such associated mandrel, is automatically corrected or accommodated for by camming or following engagement of nose 132 with the inner surfaces of the upper end of the slightly misaligned core tube. Depending upon the cause of the misalignment, the entrance of nose 132 into the upper end of core tube 14 and its engagement with the inner surfaces of such core tube, will cause corrective tilting movements of the core tube and/or compensating tilting movements of both the core tube and the mandrel. It is anticipated that a range of permissive tilting movements of mandrel 116 on the order of about six degrees will accommodate for misalignments occasioned by the tilting of the spools relative to their support pins, as well as for misalignments occasioned by slight inaccuracies in the positioning of carriers 18. However, the mandrel is not capable of accommodating major misalignments, such as would be occasioned by major displacements of a carrier transversely of the conveyor or the improper operation of the first and second pair of gate devices. In the case of a major misalignment of the axis of a core tube of a presented spool with the axis of its associated mandrel, nose 132 will be engaged by the upper end of the core tube or yarn 16 and not be permitted to enter the core tube. Should this occur, the major misaligned spool will cause mandrel 116 to move upwardly and effect pivotal misplacement of bearing plate 162 into its overload or cut off position shown in phantom line in FIG. 3 against the return bias of spring device 168. This occurrence will be immediately sensed by microswitch 170, which is operable via a control circuit, not shown, to halt operation of cylinder 104 and thereby arrest further movement of platform 80 towards its upper or weighing position. Again, it will be understood that a clearance afforded between mandrel 116 and hanger device 118 insures that scale operating member 114 will be uneffected by malfunction induced vertical movements of the mandrel into its upper or overload position, as well as minor misalignment accommodating tilting movements of the mandrel.

By now making reference to FIGS. 3 and 11, it will be understood that if switch 170 is not operated during elevating movements of platform 80, suitable sensing means, not shown, which is responsive to positioning of platform 80 in its weighing position shown in phantom line in FIG. 1, serves to energize operator 182, such that operator rod 184 is extended and thus support-bearing plate 186 lowered to initiate the weighing operation. When this occurs spring 146 immediately serves to increase the distance between ring 144 and sleeve upper bearing portion 138 until sleeve lower end portion 140 bottoms out on nose 132, whereby to extend jaw bars 200 into their clamping positions in engagement with the inner surfaces of core tube 14. After the clamping operation has been performed, the continued downward movement of support-bearing plate 186 permits lowering of the whole of mandrel 116 sufficiently to bring rod head end portion 126 into bearing surface engagement with hanger device plate surface 156. The control circuit for cylinder 104 is responsive to operation of operator 182 such that lowering of carrier 18 from supporting engagement with the spools is initiated as shown as the clamping operation has been performed, whereby to permit the spools to be entirely supported by mandrel 116 and thus scale operating member 114, during the weighing operation. If mandrel 116 had been subjected to tilting movements incident to insertion of nose 132 within the upper end of core tube 14, the mandrel will tend to automatically return to its vertically disposed position as a result of camming engagement of rod head end 126 with surface 156 and the pendulum effect produced by the weight of the mandrel supported spool.

Operator 182 and cylinder 104 may be essentially simultaneously operated after the weighing operation has been completed, as determined by a suitably generated control signal or a time delay mechanism, to bring support pins 26 into supporting engagement with lower ends of core tubes of the "weighed spools", as jaw bars 200 are retracted from gripping engagement with their upper ends. After the core tubes of the weighed spool are released by jaw bars and seated in the support pins, cylinder 104 is again operated to return platform 80 to its lower position and replace carrier 18 in supporting engagement with belt elements 18. The above described series of operations occurs each time a row of spools 12 is presented to the weighing station in operative alignment with weighing units 32.

Control circuits suitable for use in timing and/or controlling operations of escapement device 66, gate devices 68 and 70, cylinder 104 and weighing unit 32 are well within the present state of the art and adapted to be constructed from commercially available components. Thus, the control circuit forms no part of the present invention and may be electrically or pneumatically operated, as desired.

FIG. 12 illustrates an alternative form of the present invention wherein the lower or article gripping end of mandrel 116 is modified in order to permit external, as opposed to internal, gripping of an article, such as a bottle 12'. The form of the invention shown in FIG. 12 principally differs from that previously described in that the article gripping assembly includes a plurality of jaw devices 142', which are supported solely on nose 132 by pivot pins 206' for vertical pivotal movements between the article clamping and release positions shown in full and phantom line in FIG. 12, respectively. Jaw devices 142' are preferably three in number and arranged to lie within angularly related vertically disposed planes in the same manner indicated in FIG. 10 in the case of jaw devices 142.

The inwardly facing edge of the lower or clamping end of each jaw device 142' is preferably fitted with a resiliently deformable clamping pad 220, whereas the inwardly facing edge of the upper or operating end of each of the jaw devices is arranged for camming engagement with a cam surface 222 defined by sleeve operating end portion 140. The outwardly facing edge of the upper end of each of the jaw devices is arranged in engagement with a spring device, which may be in the form of a mandrel encircling, resiliently deformable O-ring 224, adapted to normally retain the jaw devices in their release positions.

In operation, nose 132 normally enters the open mouth of bottle 12' for the purpose of insuring alignment between the bottle and the mandrel, as the bottle is lifted into weighing association with the mandrel. Thereafter, relative downward movement of sleeve 136 along rod 124 between the released and clamping positions thereof shown in phantom and full line in FIG. 12, respectively, serves to bring cam surface 222 into camming engagement with jaws 142' resulting in the latter being driven into their clamping positions against the return bias of O-ring 224.

The external article gripping assembly shown in FIG. 12 may be altered, as by employing a mechanical linkage between sleeve operating end portion 140 and jaw devices 142' as a replacement for the disclosed camming arrangement. Further, the assembly may be altered by forming nose 132 with a concave camming or article contour following surface for use in cases where the article is not formed with an opening or has its opening closed during the weighing operation, as would be the case if bottle 12' were fitted with a cap or other closure.

I claim:

1. An article weighing apparatus comprising in combination:
    a weighing station having at least one article weighing unit, said unit including a stationary scale device having a vertically displaceable operating member, clamping means for releasably clamping said article, and means for operably interconnecting said clamping means with said operating member when an article to be weighed is clamped thereby, while normally supporting said clamping means free of operable connection with said operating member;
    conveyor means for transporting articles through said weighing station and for positioning a transported article in essential vertical alignment with said clamping means; and
    elevating means operable for lifting said transported article when disposed in essential vertical alignment with said clamping means from said conveyor and into weighing association with said clamping means to permit the lifted article to be clamped by said clamping means and weighed by said scale device and for lowering a weighed article onto said conveyor means for subsequent discharge from said weighing station.

2. An article weighing apparatus according to claim 1, wherein said means of said weighing station is operable to support said clamping means for vertical tilting movements when free of operable connection with said operating member, and said clamping means includes article contour following means engageable with said article when lifted into weighing association with said clamping means for vertically tilting said clamping means as required to accommodate for minor vertical misalignments of said lifted article with said clamping means.

3. An article weighing apparatus according to claim 2, wherein said means of said weighing station permits vertical movements of said clamping means towards said scale device free of engagement with said operating member resulting from engagement of said contour following means with said article when lifted while in major vertical misalignment with said clamping means and includes means responsive to said vertical movements of said clamping means to arrest continued lifting movements of said article by said elevating means.

4. An article weighing apparatus having a weighing unit and elevating means to effect lifting and lowering movements of an article into and out of weighing association with said weighing unit, the improvement wherein said weighing unit comprises in combination:
    a stationary scale device having a vertically displaceable scale device operating member;
    a mandrel having clamping means for releasably clamping said article;
    hanger means fixed to said operating member and defining a mandrel supporting surface;
    support means operable to vertically displace said mandrel relative to said hanger means from an upper rest position wherein said support means supports said mandrel free of engagement with said supporting surface and a lower weighing position wherein said mandrel is supportedly engaged by said supporting surface and free of engagement with said support means, said clamping means being inoperative for clamping said article when said mandrel is in said rest position and being operable for clamping said article when said mandrel is in said lower weighing position.

5. An article weighing apparatus according to claim 4, wherein said mandrel includes an article contour following lower end portion, and said mandrel when in said rest position is supported for universal vertical tilting movements free of contact with said hanger means about a center disposed intermediate said support means and said hanger means in response to engagement of said contour following lower end portion with said article during lifting movements thereof.

6. An improvement according to claim 5, wherein said support means defines the range of tilting movements of said mandrel.

7. An article weighing apparatus having a weighing unit and elevating means operable to effect vertical movements of an article into and out of weighing association with said weighing unit, the improvement wherein said weighing unit comprises in combination:
    a stationary scale device having a vertically displaceable scale device operating member;
    hanger means fixed to said operating member and defining a generally upwardly facing supporting surface;
    bearing plate means;
    support-bearing means;
    a mandrel having upper head end portion, a lower article clamping end portion, and first and second bearing portions arranged in a spaced relationship lengthwise of said mandrel and for cooperative engagement with said bearing plate means and said support-bearing means, respectively, said support-bearing means having a first rest position wherein it engages with said second bearing portion for supporting said mandrel and for maintaining said first bearing portion in engagement with said bearing plate means and said head end portion free from supporting engagement by said hanger means, said support-bearing means being movable to a relatively lower weighing position for lowering said head end portion into supporting engagement with said hanger means and removing said support-bearing means and said bearing plate means from engagement with said first and second bearing portions, said bearing plate means and said first bearing portion when engaged defining a center about which tilting movements of said mandrel may occur in response to engagement of said lower article clamping end portion with an article presented to said weighing unit for weighing, said article clamping end portion including means operatively responsive to movement of said support-bearing means from said rest position into said weighing position to effect clamping of an article presented to said weighing unit for weighing and operatively responsive to movement of said support-bearing means from said weighing position into said rest position to release a weighed article.

8. A weighing unit according to claim 7, wherein said bearing plate means is supported for movements about an essentially horizontally disposed axis, means are provied for normally constraining said bearing plate means from pivotal movements about said axis resulting from malfunction producing engagement of said article with said article clamping end portion as said article is lifted by said elevating means into weighing association with said weighing unit when said support-bearing means is in said rest position, and means are provided to sense said vertical pivotal movements of said bearing plate means for arresting article lifting operation of said elevating means.

9. A weighing unit for weighing an article presented thereto, said weighing unit comprising in combination:
a stationary scale device having a vertically displaceable scale device operating member;
a hanger means fixed to said operating member and defining a supporting surface;
a generally vertically extending mandrel comprising a rod member having an upper head end portion, a lower article contour following end portion and bearing means disposed relatively adjacent said head end portion in a direction lengthwise of said rod member; a sleeve member supported by said rod member intermediate said bearing means and said lowerend portion for lengthwise directed sliding movements, said sleeve member including an upper bearing portion and a lower operating portion; spring means resiliently coupling said rod member and said sleeve member for biasing said sleeve operating portion downwardly towards said lower end portion; article clamping means operably connected with said lower end portion and said sleeve operating portion for movement between article clamping and article releasing conditions when said sleeve operating portion is positioned relatively adjacent and relatively remote from said lower end portion, respectively;
a bearing plate defining a downwardly facing bearing surface arranged for engagement with said rod bearing means;
a support-bearing means including a support-bearing plate defining an upwardly facing bearing surface arranged for engagement with said sleeve upper bearing portion, and means to move said support-bearing plate between an upper rest position and a lower weighing position, the parts of said weighing unit being arranged whereby when said support-bearing plate is in said rest position, said upwardly facing bearing surface is disposed in supporting engagement with said sleeve upper bearing portion, said bearing means of said rod member is arranged in underengagement with said downwardly facing bearing surface, said sleeve operating portion is maintained relatively remote from said lower end portion against the bias of said spring means, and said rod member head end portion is disposed above and free of supporting engagement with said supporting surface of said hanger means, and whereby when said support-bearing plate is in said weighing position, said upwardly facing bearing surface is disposed below and free of engagement with said sleeve upper bearing portion, said bearing means of said rod member is disposed below and free of engagement with said downwardly facing bearing surface, said sleeve operating portion is maintained adjacent to said lower end portion by said spring means, and said rod head end portion is disposed in supporting engagement with said supporting surface of said hanger means, and the distance moved by said support-bearing plate between said rest and weighing positions being in excess of the distance moved by said sleeve operating portion relative to said lower end portion.

10. An article weighing unit according to claim 9, wherein said rod member bearing means cooperates with said downwardly facing bearing surface when engaged therewith to define a center about which tilting movements of said mandrel may occur as a result of engagement of said lower end portion with said article, and said support-bearing plate limits the extent of said tilting movements to prevent engagement of said rod member with said hanger means when said support-bearing plate is in said rest position.

11. An article weighing unit according to claim 10, wherein said bearing plate is supported for vertical movements about an essentially horizontally disposed pivot axis whereby said downwardly facing bearing surface may move from a normal rest position in a direction vertically towards said scale device in response to upwardly directed forces applied to said rod member by engagement of said lower end portion with said article while its bearing means is disposed in engagement with said downwardly facing bearing surface, means are provided to normally constrain said downwardly facing bearing surface from movement from said rest position, and means are provided to sense said movement of said downwardly facing bearing surface from said rest position.

12. An article weighing unit according to claim 10, wherein said article is characterized as having an opening and said lower end portion is dimensioned to be received within said article opening for effecting tilting movements of said mandrel as required to arrange said mandrel and article opening in essential axial alignment.

13. An article weighing unit according to claim 12, wherein said article clamping means includes a plurality of clamping jaws movably carried by both said lower end portion and said sleeve operating portion for movement between a radially retracted releasing condition and a radially extended clamping condition in which said jaws are adapted to clampingly engage bounding surfaces of said article opening.

14. An article weighing unit according to claim 12, wherein article clamping means includes a plurality of clamping jaws carried by said lower end portion for pivotal movements within angularly related vertically disposed planes between release positions and clamping positions wherein said jaws externally clamp said article, means tending to maintain said jaws in said release position, and cam surface means defined by said sleeve operating portion, said cam surface moving said jaws into said clamping position upon movement of said sleeve operating portion into position relatively adjacent said lower end portion.

15. An article weighing unit according to claim 10, wherein said article clamping means is adapted to externally clamp said article.

* * * * *